Feb. 19, 1929. 1,702,441
A. Y. HOY
COAL CUTTING MACHINE
Filed Feb. 15, 1926  3 Sheets-Sheet 1

Inventor:
Austin Young Hoy.
Attorney.

Feb. 19, 1929.
A. Y. HOY
1,702,441
COAL CUTTING MACHINE
Filed Feb. 15, 1926   3 Sheets-Sheet 2
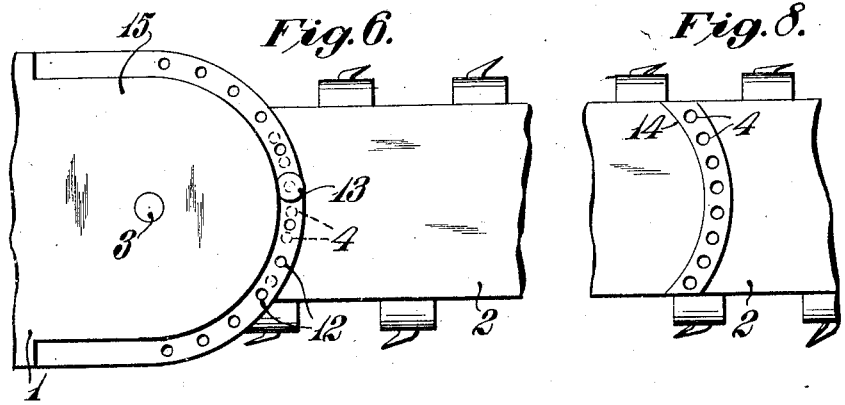
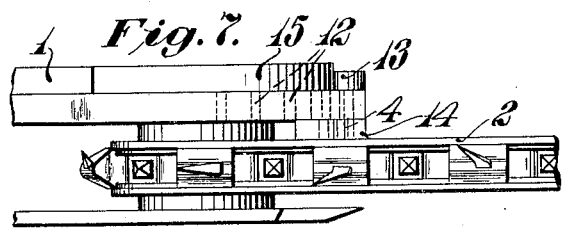
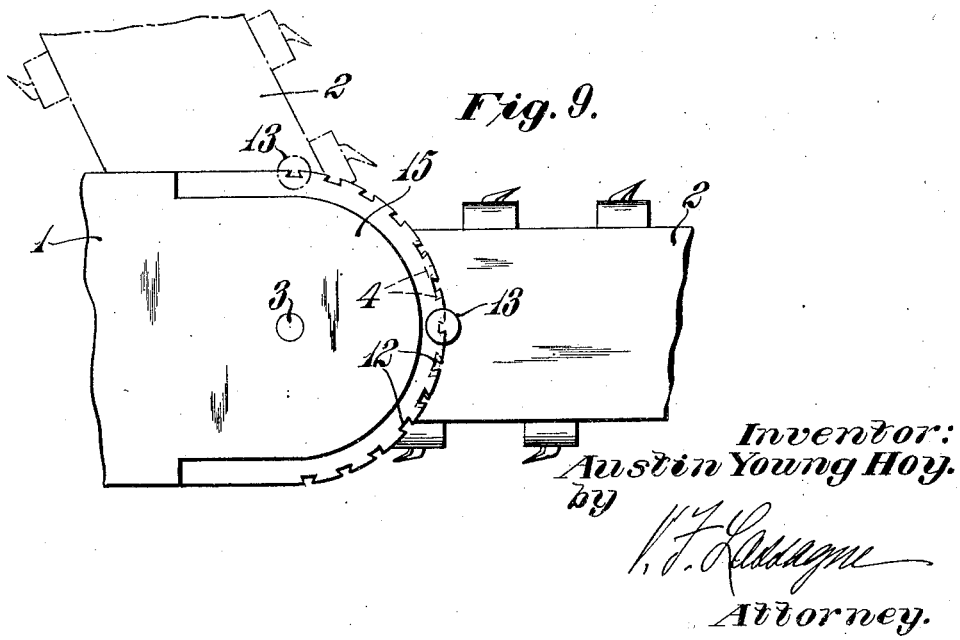
Inventor:
Austin Young Hoy.
by
Attorney.

Feb. 19, 1929.
A. Y. HOY
1,702,441
COAL CUTTING MACHINE
Filed Feb. 15, 1926     3 Sheets-Sheet 3
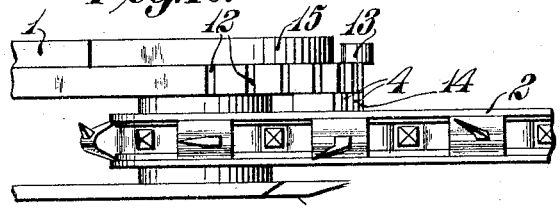
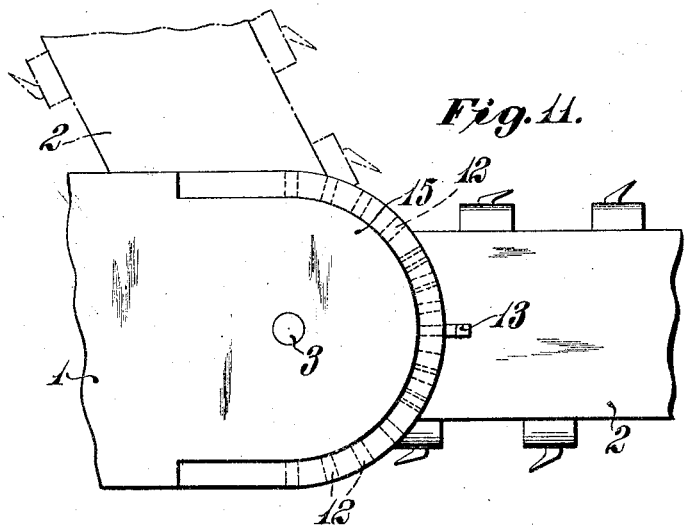
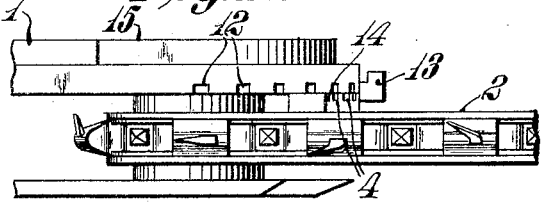
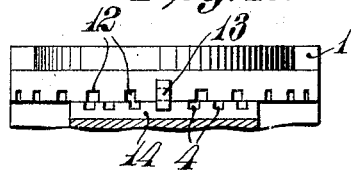
Inventor:
Austin Young Hoy.
by
Attorney.

Patented Feb. 19, 1929.

1,702,441

UNITED STATES PATENT OFFICE.

AUSTIN YOUNG HOY, OF LONDON, ENGLAND, ASSIGNOR TO SULLIVAN MACHINERY COMPANY, OF CHICAGO, ILLINOIS, A CORPORATION OF MASSACHUSETTS.

COAL-CUTTING MACHINE.

Application filed February 15, 1926, Serial No. 88,404, and in Great Britain May 13, 1925.

This invention relates to coal-cutting machines of the swinging-jib type, and has for its main object to provide an improved form of lock for holding the jib securely in its adjusted position during cutting. It is sometimes necessary, particularly when using this type of machine for shearing, to be able to alter the angle of the jib by very small amounts in order that the free end of the jib may be brought to the height required for any particular working, and it is necessary to hold it firmly in any of the numerous positions to which it is thus adjusted.

The present invention comprises therefore, in a mining machine having a swinging cutting member, the combination of a part moving with the cutting member and provided with bolt-holes, or equivalent recesses, a part of the machine fixed relatively to said cutting member and provided with corresponding bolt-holes or equivalent recesses, the bolt-holes or recesses in said part of the machine and in the part moving with the cutting member being in vernier relationship to one another, and a locking bolt or key to fit pairs of the bolt-holes or recesses when the said holes or recesses of a pair are brought into coincidence in the adjustment of the cutting member about its axis of rotation. The purpose of this is to provide a construction, wherein with a certain number of locking holes or recesses in both the sets coincidence of the holes shall occur and the two parts shall be positively lockable by the bolt or key at angular intervals in the range of adjustment of the cutting member that are substantially smaller than the angular distances by which the locking-holes or recesses in either set are separated from one another.

The holes in each of the aforesaid parts may, for instance, be in a circle or in a plurality of concentric circles; in the latter case ample metal is left between neighbouring holes to resist working stresses. Preferably, each set of holes is arranged in a plurality of concentric circles and the holes in one circle are staggered in relation to the holes in another circle.

The accompanying diagrammatic drawings show various applications of the invention to a coal-cutting machine of the swinging jib type.

In these drawings:

Figure 6 is a top plan or side view of a portion of a machine and jib illustrating another modification.

Figure 7 is a side elevation or plan of the parts shown in Figure 6.

Figure 8 is a face view of a portion of the jib shown in Figure 6.

Figure 9 is a side view or plan of a portion of a machine and jib illustrating a further modification.

Figure 10 is a side elevation or plan of the parts shown in Figure 9.

Figure 11 is a side view or plan of a portion of a machine and jib illustrating yet another modification.

Figure 12 is a side elevation or plan of the parts shown in Figure 11, and

Figure 13 is a front view of a portion of these parts.

Figure 1:
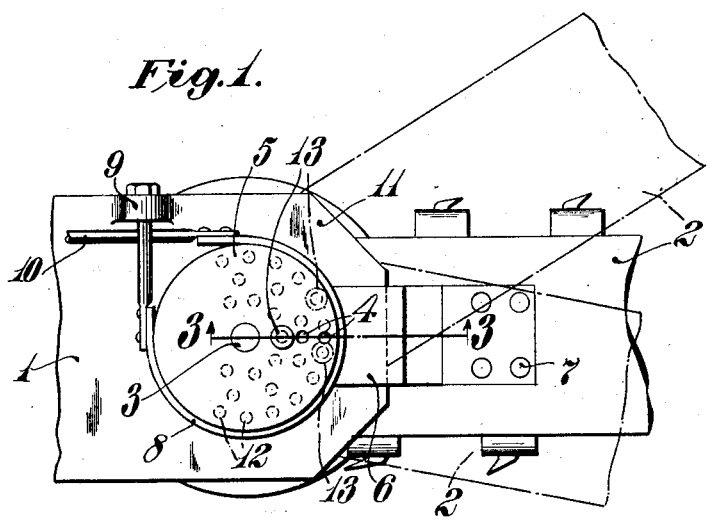
Figure 1 is an under plan or side view of a machine showing the jib in various positions.

Like reference numerals indicate like parts throughout the drawings in which the cutter end of a known type of machine is indicated by the reference numeral 1 and the swinging jib or cutter bar by the reference 2, the jib being pivoted at 3 in known manner to swing relatively to the machine frame.

Figure 2:
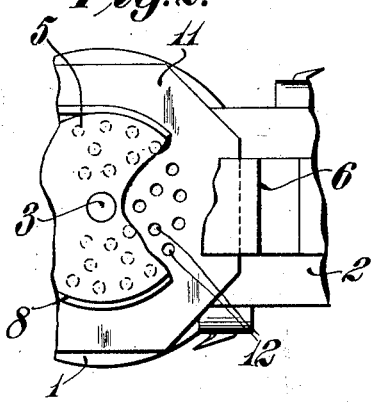
Figure 2 is a similar view with parts broken away and other parts omitted.
Figure 3:
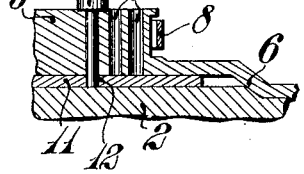
Figure 3 is a fragmentary sectional view on the line III—III of Figure 1.

In the construction shown in Figures 1–3 it will be seen that one set of holes 4 of which three are shown, is provided in a drum 5 pivotally mounted at 3 and secured to the jib 2 to rotate therewith by means of the radially extending member 6 which is attached at 7 to the jib. A band 8 surrounds the drum, being anchored at one end at 9 to the machine and having its other end secured to an operating member 10 by which the band may be tightened around the drum to control the slewing of the jib as desired. The aforesaid drum is mounted adjacent the bottom plate 11 of the machine and in this plate the other set of holes 12 is located; 13 is the locking bolt. It will be observed that this set of holes is arranged in three concentric circles, the holes in one circle being in staggered relation to the holes in another circle, and constituting with the set of holes in the movable element the equivalent of two single rows of holes in vernier relationship to one another. Each row of each set may have a number of holes in vernier relationship to provide a finer adjustment. The staggered arrangement of the holes also enables ample metal to be left between adjacent holes to resist working stresses.

The holes in the plate or in the drum preferably extend through an arc of about 240° to enable the jib to be locked in either of its extreme positions or in any intermediate position.

Figure 5:
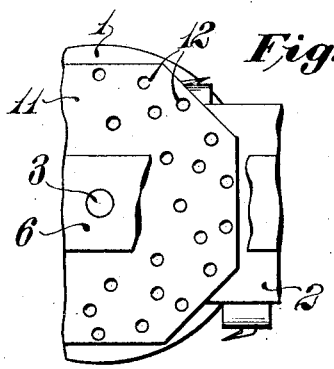
Figure 5 is a view similar to that shown in Figure 4, but with parts broken away and with other parts omitted.
Figure 4:
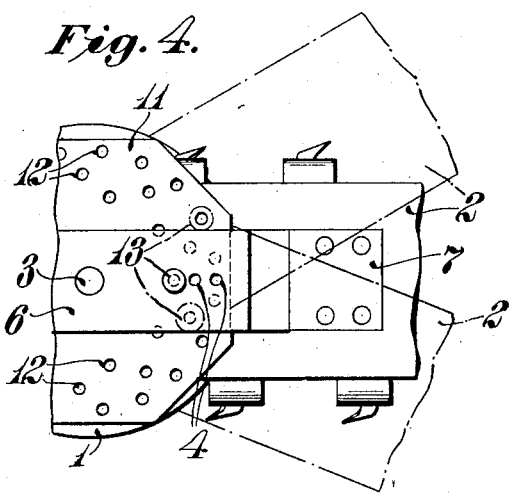
Figure 4 is a view similar to that shown in Figure 1, but illustrating a modification.

Figures 4 and 5 show a similar arrangement of the two set of holes but in this case the brake drum is omitted and the holes 4 are provided in the radial member 6 which can swing with the jib about the pivot 3.

In the arrangement shown in Figures 6–8 the set of holes 4 movable with the jib is located in the top face of the jib itself, preferably in a raised bearing piece such as 14 thereon, and the other set of holes 12 is arranged around the top plate 15 overhanging the jib. Obviously with this arrangement the pitch between the holes 4 is different from that of the holes 12 to provide the vernier adjustment.

In Figures 9 and 10 a similar arrangement is shown, the holes 4 and 12 being replaced by dove tail recesses in the peripheries of the parts 14 and 15, while in Figures 11 to 13 recesses are provided in the abutting surfaces of these parts, the locking bolt 13 being adapted to engage the corresponding recesses. Obviously in these examples also the recesses are of different pitch to provide the vernier adjustment.

It will be understood that the above constructional arrangements are illustrative of the application of the invention to one particular type of machine and that the invention is not limited to such illustrative examples, it being also applicable to other types of machines having a swinging cutting member.

I claim:—

1. In a mining machine having a swingable cutting member, the combination with the said cutting member of a brake drum provided with a set of locking holes therein and adapted to move with the cutting member about the pivotal axis thereof relatively to an adjacent part of the machine provided with a set of corresponding locking holes, the holes in the said sets being so circularly arranged in a plurality of concentric arcs struck from the pivotal axis of the cutting member that a hole in one set will coincide with a hole in the other set at angular intervals in the rate of adjustment of the cutting member that are substantially smaller than the angular distances by which the holes in either set are separated from one another, locking means adapted to engage said coinciding holes, and braking means adapted to engage said brake-drum.

2. In a mining machine, the combination of a pivoted cutting member, a brake-drum rotatably mounted on the pivotal axis of said cutting member and having locking holes therein, means operatively connecting said drum to move with said cutting member including a radially extending arm on said drum, braking means arranged to engage said brake-drum, and locking means adapted to be engaged with said locking holes therein and with corresponding locking holes in an adjacent part of the machine.

3. In a mining machine having a pivoted cutting member, a brake-drum rotatably mounted on the pivotal axis of said cutting member and movable therewith relatively to an adjacent fixed part on the machine having a set of locking holes therein arranged in a plurality of concentric arcs struck from the said pivotal axis of the cutting member, the holes in one arc being staggered in relation to the holes in another arc, the said brake-drum having a second set of locking holes therein adapted to register with holes in the first said set at angular intervals in the range of adjustment of the cutting member that are smaller than the angular distances by which the holes in each arc are separated from one another, locking means adapted to engage the said holes, and braking means arranged to engage the periphery of said brake-drum.

4. In a mining machine having a swingable cutting member, a vernier locking device operable between a part moving with the cutting member and a part of the machine which does not partake of swinging movement with the cutter bar, said part moving with the cutting member having a braking surface struck on an arc from the axis of swing, and radially acting braking means coacting therewith.

5. In a mining machine having a swingable cutting member mounted to swing in a vertical plane, a vernier locking device operable between a part moving with the cutting member and a part of the machine which does not partake of swinging movement with the cutter bar, said part moving with the cutting member having a braking surface struck on an arc from the axis of swing, and radially acting braking means coacting therewith.

In testimony whereof I affix my signature.

AUSTIN YOUNG HOY.